(12) United States Patent
Yang et al.

(10) Patent No.: US 10,744,641 B2
(45) Date of Patent: *Aug. 18, 2020

(54) GUIDANCE ROBOT

(71) Applicant: LG ELECTRONICS INC., Seoul (KR)

(72) Inventors: Sunho Yang, Seoul (KR); Haemin Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 306 days.

This patent is subject to a terminal disclaimer.

(21) Appl. No.: 15/853,587

(22) Filed: Dec. 22, 2017

(65) Prior Publication Data

US 2018/0178377 A1   Jun. 28, 2018

(30) Foreign Application Priority Data

Dec. 23, 2016   (KR) .................. 10-2016-0178603
Dec. 29, 2016   (KR) .................. 10-2016-0182841

(51) Int. Cl.
*B25J 9/16* (2006.01)
*B25J 5/00* (2006.01)
(Continued)

(52) U.S. Cl.
CPC ............. *B25J 9/161* (2013.01); *B25J 5/007* (2013.01); *B25J 9/0003* (2013.01); *B25J 9/0009* (2013.01);
(Continued)

(58) Field of Classification Search
CPC ........ B25J 9/1697; B25J 5/007; B25J 9/0003; B25J 9/0009; B25J 11/008; B25J 19/00;
(Continued)

(56) References Cited

U.S. PATENT DOCUMENTS 6,920,376 B2 * 7/2005  Jouppi ............... G06F 3/04815
                                                            348/159
7,164,969 B2 * 1/2007  Wang ...................... B25J 5/007
                                                            700/245
(Continued)

FOREIGN PATENT DOCUMENTS

CN     105034002      11/2015
EP     1 932 632     6/2008
(Continued)

OTHER PUBLICATIONS

Ignatiev et al. Autonomous omni-wheeled mobile robots, 2016, IEEE, p. 1-4 (Year: 2016).*

(Continued)

*Primary Examiner* — McDieunel Marc
(74) *Attorney, Agent, or Firm* — Ked & Associates, LLP

(57) ABSTRACT

A guidance robot comprises a driving unit that includes wheels and a motor for moving; a body that is provided on the driving unit and includes sensors for autonomous driving; a display unit that is coupled to the body; a stationary unit that is coupled to the top of the body; a circular rotary unit that has an opening and is provided over the stationary unit to rotate about the central axis of the stationary unit; and a stopper that extends upward from the stationary unit through the opening of the circular rotary unit.

20 Claims, 12 Drawing Sheets

(51) Int. Cl.
*B25J 9/00* (2006.01)
*B25J 19/00* (2006.01)
*B25J 11/00* (2006.01)
*B25J 13/08* (2006.01)

(52) U.S. Cl.
CPC ........... *B25J 9/1697* (2013.01); *B25J 11/008* (2013.01); *B25J 13/08* (2013.01); *B25J 19/00* (2013.01); *Y10S 901/01* (2013.01)

(58) Field of Classification Search
CPC .......... B25J 19/02; B25J 9/126; B25J 9/1689; B06K 7/1413; G06K 7/1417; G06F 19/3418; G06F 3/011; G06F 3/04815; G06Q 30/0269; H04W 4/70
See application file for complete search history.

(56) References Cited

U.S. PATENT DOCUMENTS

| | | | |
|---|---|---|---|
| 7,171,286 B2 * | 1/2007 | Wang | G06F 19/3418 700/248 |
| 8,265,793 B2 * | 9/2012 | Cross | H04W 4/70 700/259 |
| 9,720,414 B1 | 8/2017 | Theobald | |
| 2003/0028993 A1 | 2/2003 | Song | |
| 2005/0171636 A1 | 8/2005 | Tani | |
| 2005/0219356 A1 | 10/2005 | Smith et al. | |
| 2005/0277477 A1 | 12/2005 | Hajder et al. | |
| 2007/0143187 A1 | 6/2007 | Gottfurcht | |
| 2007/0150094 A1 | 6/2007 | Huang | |
| 2007/0192910 A1 | 8/2007 | Vu et al. | |
| 2008/0154488 A1 | 6/2008 | Silva et al. | |
| 2009/0173561 A1 | 7/2009 | Moriguchi et al. | |
| 2010/0094459 A1 | 4/2010 | Cho et al. | |
| 2010/0180709 A1 | 7/2010 | Choi et al. | |
| 2013/0221101 A1 | 8/2013 | Lebaschi et al. | |
| 2015/0148951 A1 | 5/2015 | Jeon et al. | |
| 2016/0171303 A1 | 6/2016 | Moore et al. | |
| 2017/0011258 A1 | 1/2017 | Pitre et al. | |
| 2017/0075962 A1 | 3/2017 | Hitchcock et al. | |
| 2017/0129602 A1 | 5/2017 | Alduaiji et al. | |
| 2017/0221130 A1 | 8/2017 | Kraus et al. | |
| 2018/0009108 A1 | 1/2018 | Yamamoto et al. | |
| 2018/0178375 A1 * | 6/2018 | Yang | B25J 9/0003 |
| 2018/0178377 A1 * | 6/2018 | Yang | B25J 19/00 |
| 2018/0192845 A1 | 7/2018 | Gu | |
| 2019/0005545 A1 * | 1/2019 | Roh | G06Q 30/0269 |
| 2019/0107833 A1 | 4/2019 | Song et al. | |

FOREIGN PATENT DOCUMENTS

| | | |
|---|---|---|
| EP | 2 025 478 | 2/2009 |
| JP | 2002-355779 | 12/2002 |
| JP | 2004-017200 | 1/2004 |
| JP | 2005-172879 | 6/2005 |
| JP | 2007-229817 | 9/2007 |
| JP | 2017-097207 | 6/2017 |
| KR | 10-0916493 | 9/2009 |
| KR | 10-2009-0128637 | 12/2009 |
| KR | 10-2010-0006975 | 1/2010 |
| KR | 10-2012-0111519 | 10/2012 |
| KR | 10-1193610 | 10/2012 |
| KR | 10-1243262 | 3/2013 |
| KR | 20-0481042 | 8/2016 |
| WO | WO 2007/041295 | 4/2007 |
| WO | WO 2016/094013 | 6/2016 |

OTHER PUBLICATIONS

Lemburg et al., AILA—design of an autonomous mobile dual-arm robot, 2011, IEE, p. 5147-5153 (Year: 2011).*
Hebert et al., Supervised Remote Robot with Guided Autonomy and Teleoperation (SURROGATE): A framework for whole-body manipulation, 2015, IEEE, p. 5509-5516 (Year: 2015).*
Zhang et al., A networked teleoperation system for mobile robot with wireless serial communication, 2009, IEEE, p. 2227-2231 (Year: 2009).*
U.S. Office Action dated Oct. 7, 2019 issued in U.S. Appl. No. 16/020,579.
U.S. Office Action dated Apr. 19, 2019 issued in co-pending related U.S. Appl. No. 16/020,579 (PBC-0626).
European Search Report dated Nov. 16, 2018 issued in Application No. 18177444.9.
European Search Report dated Sep. 7, 2018 issued in EP Application No. 18164322.2.
U.S. Office Action dated Dec. 26, 2019 issued in U.S. Appl. No. 15/936,814.
Korean Office Action dated Dec. 6, 2018 issued in KR Application No. 10-2017-0085353.
Korean Office Action dated Dec. 7, 2018 issued in KR Application No. 10-2017-0085368.
Minute Explained: "R2-D2's Tools Explained! The Ultimate Intergalactic Swiss Army Knife"; https://www.youtube.com/watch?v=ejVwqUV4LA retrieved on May 7, 2018 (XP-054978324).
European Search Report dated May 17, 2018 issued in Application No. 17209452.6.
European Search Report dated May 18, 2018 issued in Application No. 17209458.3.
European Search Report dated May 23, 2018 issued in Application No. 17209459.1.
United States Office Action dated Mar. 4, 2020 issued in U.S. Appl. No. 16/020,579.
United States Office Action dated Feb. 21, 2020 issued in U.S. Appl. No. 15/853,409.
U.S. Appl. No. 16/539,867, filed Aug. 13, 2019.
U.S. Appl. No. 15/853,409, filed Dec. 22, 2017.
U.S. Appl. No. 15/853,533, filed Dec. 22, 2017.
U.S. Appl. No. 15/853,587, filed Dec. 22, 2017.
U.S. Appl. No. 15/936,814, filed Mar. 27, 2018.
U.S. Appl. No. 16/020,579, filed Jun. 27, 2018.
United States Office Action dated Sep. 13, 2019 issued in U.S. Appl. No. 15/853,409.

* cited by examiner

GUIDANCE ROBOT

CROSS-REFERENCE TO RELATED APPLICATIONS

The present this application claims priority under 35 U.S.C. § 119 and 35 U.S.C. 365 to Korean Patent Application No. 10-2016-0178603 filed on Dec. 23, 2016 and Korean Patent Application No. 10-2016-0182841 filed on Dec. 29, 2016, whose entire disclosure are hereby incorporated by reference.

BACKGROUND

1. Field

The present disclosure relates to a guidance robot.

2. Background

In recent years, functions of robots have been expanded due to development of the deep learning technology, the autonomous driving technology, the automatic control technology, the Internet of things, and the like.

The deep learning technology corresponds to one field of machine learning. The deep learning technology is a technology in which programs make similar determinations on various situations rather than confirming conditions and setting commands in advance. A computer may perform thinking similarly to a human brain, and may analyze a vast amount of data.

In the autonomous driving technology, a machine by itself may determine a current location to move and avoid an obstacle. A robot may autonomously recognize a location through a sensor, to move and avoid an obstacle.

In the automatic control technology, a machine automatically controls its operation based on feed feeding back of a measured value obtained by checking a state of the machine. The automatic control technology may perform a control without manipulation by a user, and may perform an automatic adjustment such that an object to be controlled arrives at a target range, that is, a target value. The machine is able to decide, move, and dodge obstacles by itself.

The Internet of Things (IoT) refers to an intelligent technology and service of communicating information between people and things and between things by connecting all things based on the Internet. Devices connected to the Internet transmit and receive information without help of a person, and autonomously communicate with each other.

An intelligent robot may be implemented due to development and fusion of the above-described technologies, and various information elements and services may be provided through the intelligent robot.

A robot may be generally classified into an industrial field, a medical filed, a spatial field, and a submarine field. For example, in the mechanical processing industry such as automobile production, the robot may perform repeated operations. Many industrial robots may repeatedly perform the same operation, after a user teaches once, work which is usually performed by a person's arm.

A traffic guidance intelligent robot capable of autonomous driving is disclosed in Korean Patent No. 10-1193610 dated Oct. 26, 2012. A robot which avoids an obstacle while being autonomously driven on a crosswalk for traffic guidance is disclosed.

This robot is largely composed of a driving unit, a body, arms, and a head, and an image/voice recognition unit is provided in the head. The robot can make simple conversations with a user through the image/voice recognition unit, and for example, the head can turn left and right in accordance with the face image of a user or voice commands.

However, the robot may hit an obstacle or may collide with a person or another robot while moving. For example, at an airport where there are many users, the robot may frequently hit users and users' feet may get caught in the wheels of the robots. In this case, it may result in human injuries or huge property damages.

Further, the robot has no mechanism for finding the exact position of the head, so it is difficult to quickly turn the head toward a user. Furthermore, the robot has also no mechanism for sensing the rotational direction and amount of the head when the head is turned, so the head may be excessively turned. In addition, when the head turns 360 degrees, wires in the head are entangled.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
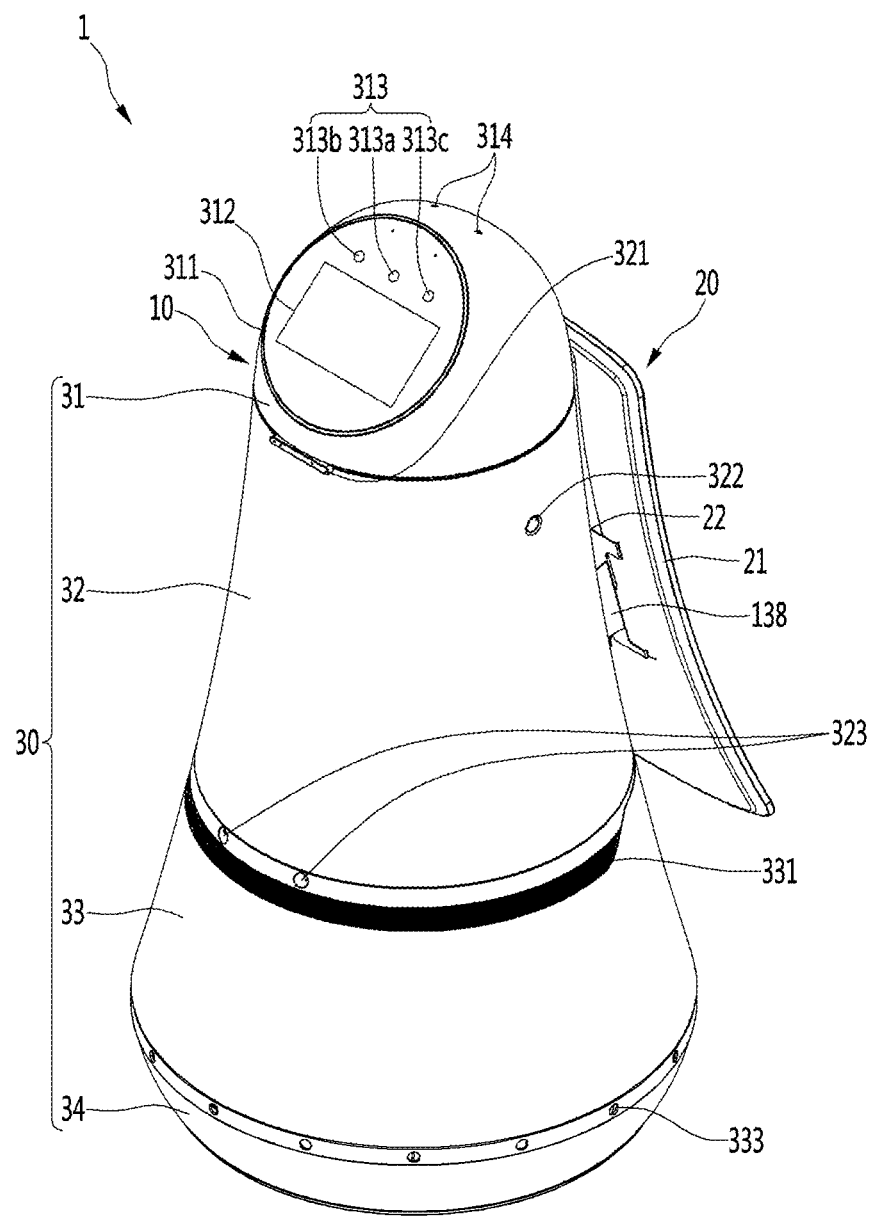
FIG. 1 is a perspective view of a guidance robot according to an embodiment of the present disclosure.
Figure 2:
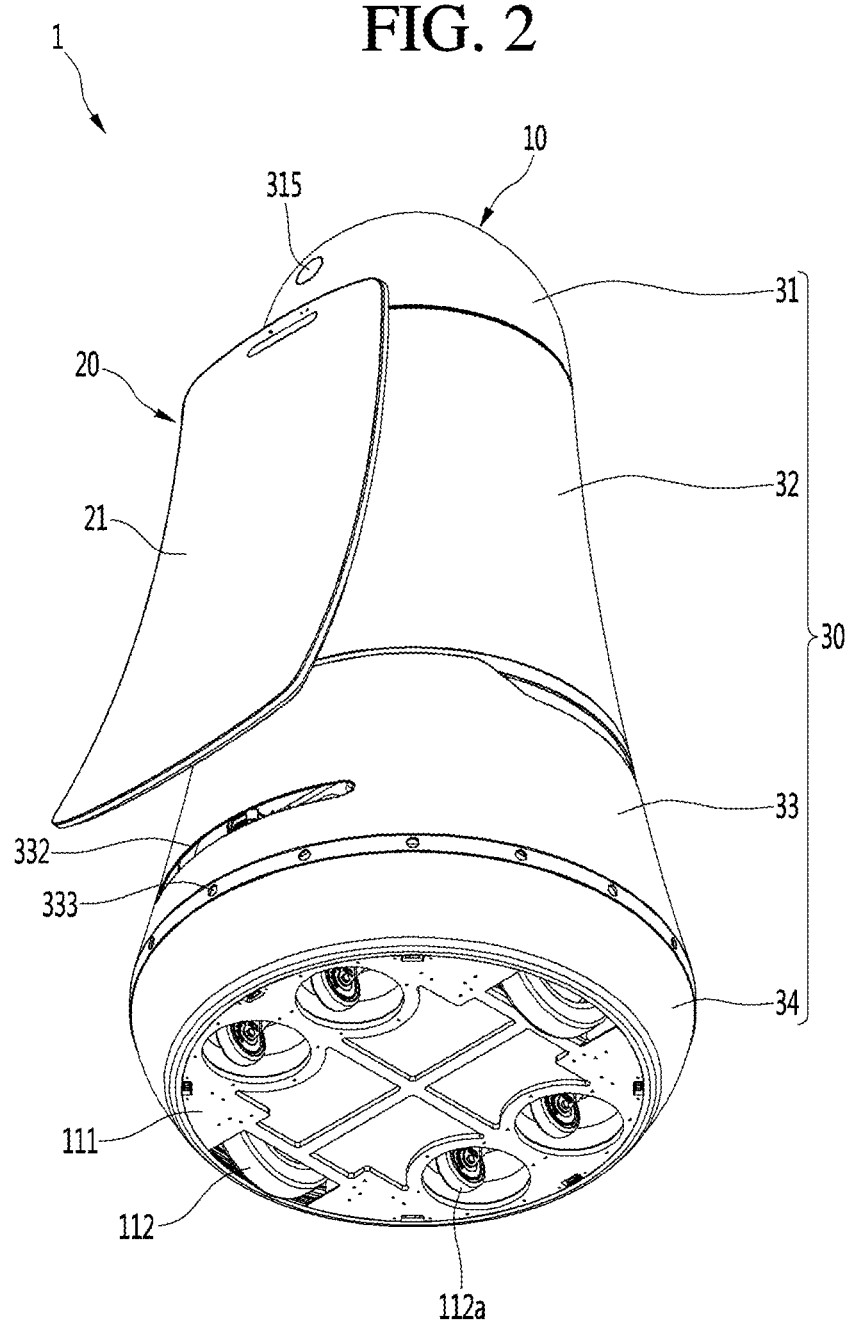
FIG. 2 is a perspective view showing the bottom of the guidance robot.
Figure 3:
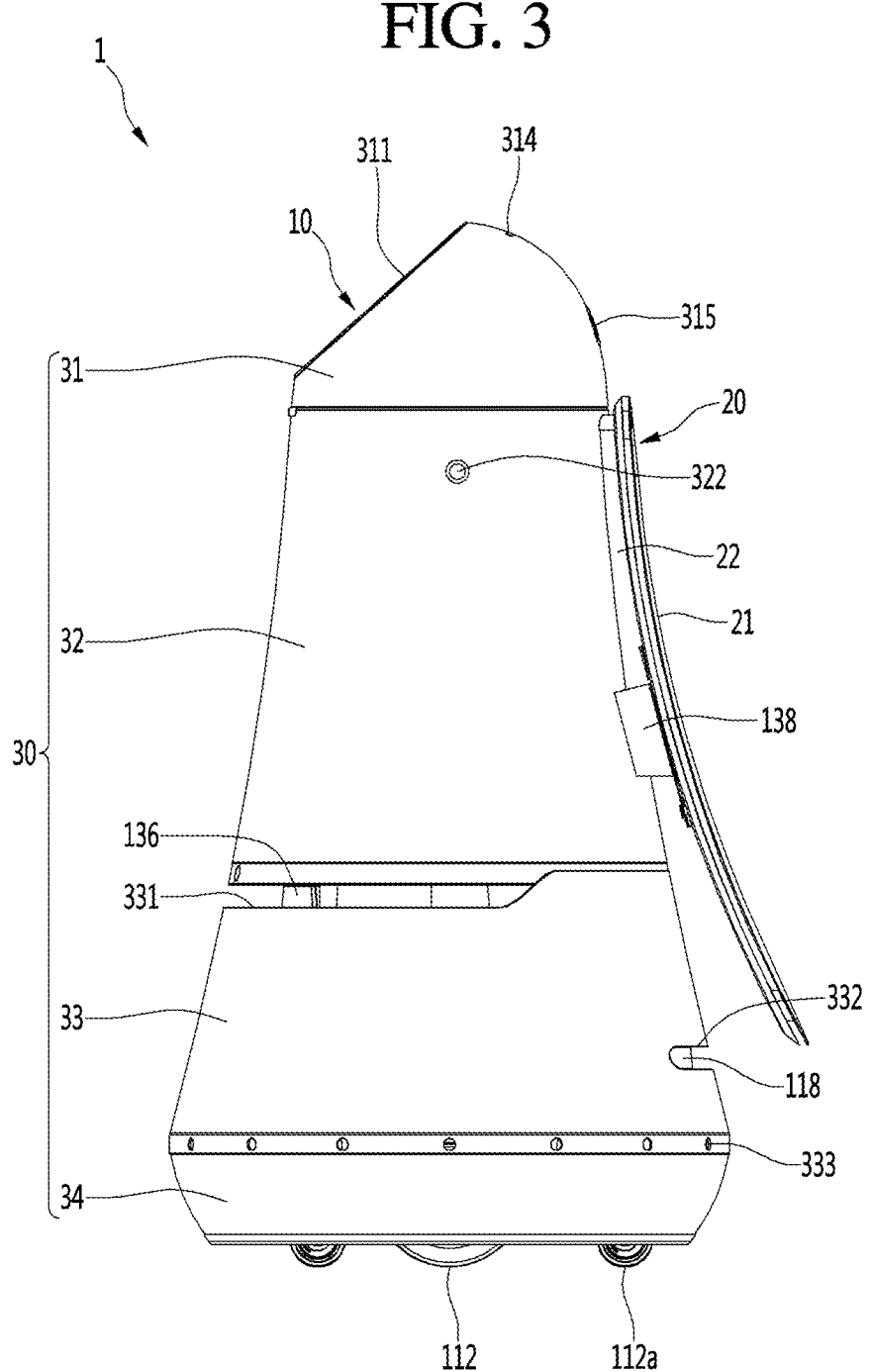
FIG. 3 is a side view of the guidance robot.
Figure 4:
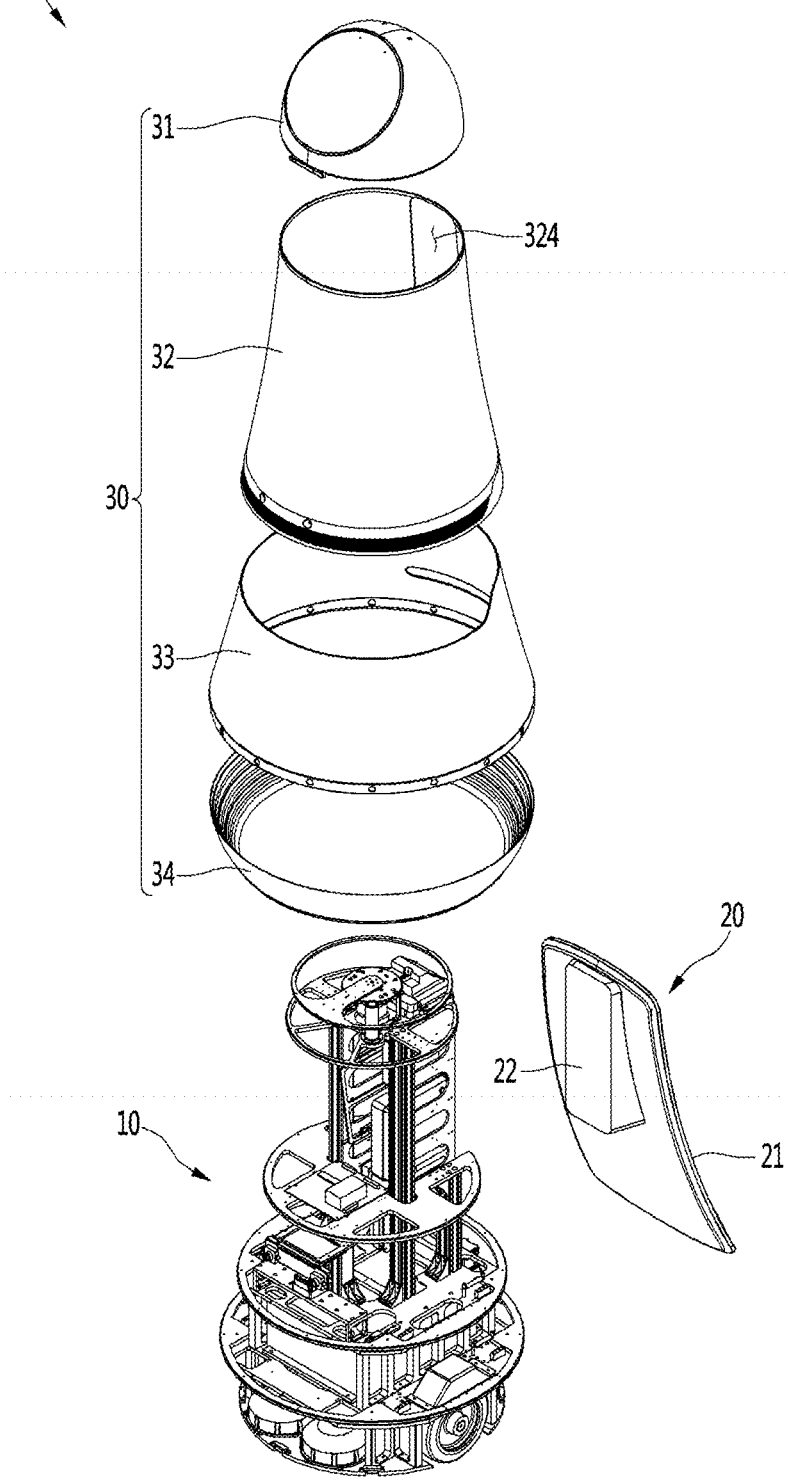
FIG. 4 is an exploded perspective view of the guidance robot.

The guidance robot according to the present disclosure may provide a route guidance service to a user in a public, private, or commercial place. The guidance robot may be driven in one direction or the other direction along a predetermined driving route.

Referring to FIGS. 1 to 4, a guidance robot 1 according to the present disclosure may include a body 10 and a display unit 20. The body may vertically extend or elongated, and may have a roly poly or tumbler shape which becomes slimmer as it goes from a lower portion to an upper portion as a whole. The body 10 may include a case 30 defining an outer appearance of the guidance robot 1.

The case 30 may include a top cover 31 arranged on an upper side of the case 30, a first middle cover 32 arranged below the top cover 31, a second middle cover 33 arranged below the first middle cover 32, and a bottom cover arranged below the second middle cover 33. The first middle cover 32 and the second middle cover 33 may be named a "middle cover".

The top cover 31 may be located at the top or uppermost end of the guidance robot 1, and may have a semispherical shape or a dome shape. The top cover 31 may be located at a height (for example, 132 to 152 cm) that is lower than a height of an adult to easily receive input or a command from the user. Further, the top cover 31 may have a tilted surface of a predetermined angle.

The top cover 31 may include a manipulation or operation unit 311 on one side of the front surface thereof. The manipulation unit or a user interface 311 may function to receive input of a command from the user. The manipulation unit 311 may include a touch monitor 312 configured to receive a touch input from the user. The touch monitor 312 may include a touch panel configured to receive input of the user, and a monitor to display information.

The manipulation unit 311 may face the upper side at a specific inclined angle such that the user may easily manipulate the touch monitor 312 while looking down the touch monitor 312. For example, the manipulation unit 311 may be arranged on a surface formed by cutting a portion of the top cover 31 or pre-formed holes. The touch monitor 312 may be inclined.

A direction in which the manipulation unit 311 faces with reference to FIG. 1 is defined as a "front side". Further, an opposite direction to the manipulation unit 311, that is, a direction in which the display unit 20 faces, is defined as a "rear side".

The manipulation unit 311 may further include an object recognition sensor 313. The object recognition sensor 313 may be arranged on an upper side of the touch monitor 312. The object recognition sensor 313 may include a 2D camera 313a and RGBD (Red, Green, Blue, Distance) sensors 313b and 313c. The 2D camera 313a may be a sensor configured to recognize a person or an object based on a 2D image.

The RGBD sensors 313b and 313c may be sensors configured to acquire a location/position or a facial image of a person. The RGBD sensors 313b and 313c may be sensors configured to detect a person or an object by using captured images having depth data, which are acquired by a camera having RGBD sensors or another similar 3D imaging device.

The plurality of RGBD sensors 313b and 313C may be configured to accurately detect the location or the facial image of the person. For example, the two RGBD sensors 313b and 313c may be configured, and may be arranged on the left side and the right side of the 2D camera 313a, respectively. Although not illustrated, the manipulation unit 311 may further include a physical button configured to directly receive input of a command from the user. The top cover 31 may further include microphones 314. The microphones 314 may function to receive input of a command of an audio signal from the user. For example, the microphones 314 may be formed at four points at an upper end of the top cover 31 to accurately receive a voice command from the user. Thus, even when the guidance robot 1 is driven or the top cover 31 is rotated, a vocal route guidance request may be accurately received from the user.

In the present embodiment, the top cover 31 may be rotated such that the manipulation unit 311 faces a driving or a movement direction while the guidance robot 1 is driven. Further, the top cover 31 may be rotated such that the manipulation unit 311 faces a location in which the user is located, when the guidance robot 1 receives a command or instruction (for example, a voice command, and the like) from the user while being driven.

Dissimilar to this, the top cover 31 may be rotated in an opposite direction to the driving direction of the guidance robot 1 when the guidance robot 1 receives a command from the user while being driven. The top cover 31 may be rotated toward the display unit 20, and the user may effectively manipulate the manipulation unit 311 while viewing route guidance service information displayed on the display unit 20.

Meanwhile, in a state in which the guidance robot 1 is driven or stopped, a direction to which the manipulation unit 311 is directed and a direction to which the display unit 20 is directed may be opposite to each other. In this case, for example, because the manipulation unit 311 faces one direction, and the display unit 20 may face an opposite direction to the one direction, there is an advantage in that information displayed on the manipulation unit 311 or the display unit 20 may be viewed in opposite directions.

The top cover 31 may further include an emergency manipulation button 315. The emergency manipulation button 315 may function to immediately stop an operation of the guidance robot 1 while the guidance robot 1 is stopped or driven. For example, the emergency manipulation button 315 may be located on a rear side of the guidance robot 1 such that the user may easily manipulate the emergency manipulation button 315 even when the guidance robot 1 is driven toward the front side.

The first middle cover 32 may be located below the top cover 31. Various electronic components including a substrate for electronic components may be located inside the first middle cover 32. The first middle cover 32 may have a cylindrical shape, a diameter of which is increased as it goes from the upper side to the lower side.

The first middle cover 32 may include an RGBD sensor 321. The RGBD sensor 321 may function to detect collision between the guidance robot 1 and an obstacle while the guidance robot 1 is driven. The RGBD sensor 321 may be located in a direction in which the guidance robot 1 is driven, that is, on a front side of the first middle cover 32. As an example, the RGBD sensor 321 may be located at an upper end of the first middle cover 32 in consideration of the height of the obstacle or the person existing on the front side of the guidance robot 1. However, although the present disclosure is not limited thereto, the RGBD sensor 321 may be arranged at various locations on the front side of the first middle cover 32.

The first middle cover 32 may further include a speaker hole 322. The speaker hole 322 may be a hole for transferring a sound generated by a speaker to the outside. One speaker hole 322 may be formed on a peripheral surface of the first middle cover 32. However, a plurality of speaker holes 322 may be formed on the peripheral surface of the first middle cover 32 to be spaced apart from each other.

Figure 5:
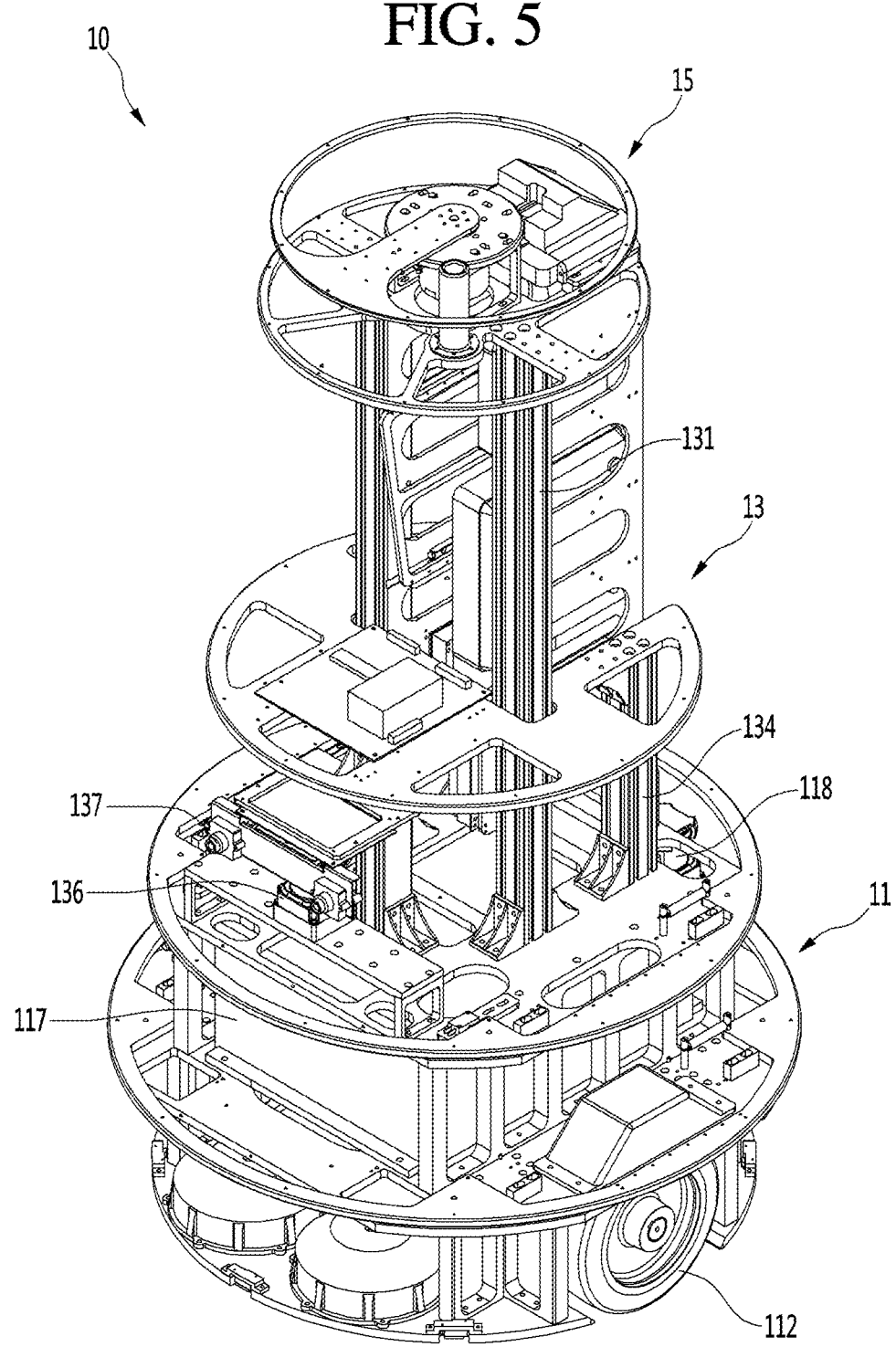
FIG. 5 is a perspective view a body of the guidance robot.

The first middle cover 32 may further include at least one stereo camera hole 323. The stereo camera hole 323 may be a hole for an operation of at least one stereo camera (indicated by reference numeral 137 of FIG. 5) installed inside the body 10. As an example, the stereo camera hole 323 may be formed at a lower end of the front side of the first middle cover 32. Accordingly, the stereo camera 137 may photograph a front area of the guidance robot 1 through the stereo camera hole 323.

The second middle cover 33 may be located below the first middle cover 32. A battery, a lidar for autonomous driving, and the like may be located inside the second middle cover 33. The second middle cover 32 may have a cylindrical shape, a diameter of which is increased as it goes from the upper side to the lower side, which is like the first middle cover 32. Further, the outside of the second middle cover 33 may be connected to the outside of the first middle cover 32 without a step. Because the outside of the second middle cover 33 and the outside of the first middle cover 32 may be smoothly connected to each other, an outer appearance may be more aesthetically pleasing.

Further, the first middle cover 32 and the second middle cover 33 may have cylindrical shapes, diameters of which are increased as they go from the upper side to the lower side, and thus, may have a roly poly or tumbler shape as a whole. When the body 10 collides with the person or the obstacle, a generated impact may be reduced.

The second middle cover 33 may include a first cutout 331 (or first opening or a first slit). The first cutout 331 may be formed from the front side to the lateral sides of a peripheral surface of the second middle cover 33. The first cutout 331 is a portion that is cut from the second middle cover 33 such that a front lidar 136, which will be described below, may be operated. Alternatively, the cutout may be an opening made during fabrication.

In detail, the first cutout 331 may be radially cut in a predetermined length or distance from a front outer peripheral surface of the second middle cover 33. The front lidar 136 may be located inside the second middle cover 33. Further, the first cutout 331 may be formed on the peripheral surface of the second middle cover 33, which corresponds to a position of the front lidar 136, by cutting a periphery of the second middle cover 33. The first cutout 331 and the front lidar 136 may face each other, and the front lidar 136 may be exposed to the outside through the first cutout 331.

As an example, the first cutout 331 may be cut from the front side of the second middle cover 33 along the periphery or circumference of the second middle cover 33 by 270 degrees. The first cutout 331 is formed in the second middle cover 33 to prevent a laser beam emitted from the front lidar 136 from being directly irradiated to eyes of an adult or a child.

The second middle cover 33 may further include a second cutout 332 (or a second opening or a second slit). The second cutout 332 may be formed from the rear side to the lateral sides of the peripheral surface of the second middle cover 33. The second cutout 332 is a portion that is cut from the second middle cover 33 such that a rear lidar 118, which will be described below, may be operated.

The second cutout 332 may be radially cut in a predetermined length from a rear outer peripheral surface of the second middle cover 33. The rear lidar 118 may be located inside the second middle cover 33. The second cutout 332 may be formed at a point which corresponds to a location of the rear lidar 118 by cutting the periphery of the second middle cover 33, and the rear lidar 118 may be exposed to the outside through the second cutout 332. As an example, the second cutout 332 may be cut from the rear side of the second middle cover 33 along the periphery of the second middle cover 33 by 130 degrees. Alternatively, a second opening corresponding to the second cutout 332 may be made during the fabrication of the second middle cover 33.

In the present embodiment, the first cutout 331 may be vertically spaced apart from the second cutout 332 so as not to be connected to the second cutout 332. Further, the first cutout 331 may be located above the second cutout 332.

If the first cutout 331 and the second cutout 332 are located on the same line, a laser beam emitted from a lidar of one guidance robot may be irradiated to a lidar of another guidance robot. Because the laser beams emitted from the lidars of the guidance robots interfere with each other, it is difficult to detect an accurate distance. Because it is not possible to detect a distance between the guidance robot and an obstacle, there is a problem in that it is difficult to perform normal driving, and the guidance robot and the obstacle may collide with each other.

The second middle cover 33 may further include ultrasonic sensors 333. The ultrasonic sensors 333 may be a sensor configured to measure a distance between an obstacle and the guidance robot 1 using an ultrasonic signal. The ultrasonic sensors 333 may function to detect an obstacle that is adjacent (neighboring obstacles) to the guidance robot 1. As an example, the plurality of ultrasonic sensor 333 may be configured to detect obstacles that are adjacent to the guidance robot 1 in all directions. Further, the plurality of ultrasonic sensors 333 may be located along a lower periphery of the second middle cover 33 to be spaced apart from each other.

The bottom cover 34 may be located below the second middle cover 33. Wheels 112, casters 112a, and the like may be located inside the bottom cover 34. The bottom cover 34 may have a cylindrical shape, a diameter of which is decreased as it goes from the upper side to the lower side, which is dissimilar to the first middle cover 32 and the second middle cover 33. The body 10 may have a roly poly or tumbler shape as a whole, so that an impulse or shock applied when a robot collides may be reduced, and a lower end of the body 10 has an inward-depressed structure, so that a foot of a person may be prevented from being caught by wheels of the robot.

A base 111 may be located inside the bottom cover 34. The base 111 may define the bottom surface of the guidance robot 1. Further, the wheels 112 for driving of the guidance robot 1 may be provided in the base 111. One wheel 112 may be located on each of the left and right sides of the base 111.

The casters 112a for assisting the driving of the guidance robot 1 may be provided in the base 111. The plurality of casters 112a may be configured to manually move the guidance robot 1. As an example, two casters 112a may be located on each of the front and rear sides of the base 111.

According to the above-described structure of the casters 112a, there is an advantage in that when the guidance robot 1 is switched off or the guidance robot 1 should be manually moved, the guidance robot 1 may be pushed and moved without applying a large force.

The display unit 20 may vertically extend from one side of the guidance robot 1. The display unit 20 may include a curved display 21. The curved display 21 may be located on a rear side of the first middle cover 32. The curved display 21 may function to output visual information (for example, airport gate inquiry information, route guidance service information, and the like) related to a service being currently provided.

Further, the curved display 21 may have a shape that is outwards curved at a predetermined curvature. The curved display 21 may have a generally concave shape. The curved display 21 may have a shape that is further inclined or curved rearward as it goes from the upper side to the lower side. In other words, the curved display 21 may become farther away from the case 30 as it goes from the upper side to the lower side.

According to the above-described structure of the display unit 20, there is an advantage in that information displayed on the curved display 21 is seen well even at a location that is far from the guidance robot, and the information displayed on the curved display 21 is seen even at various angles without distortion as well.

The guidance robot 1 may move along a predetermined path to guide the user through a way. Further, the user may view the display unit 20 installed on the rear side of the guidance robot 1 while following the guidance robot 1. Even when the guidance robot 1 is driven for route guidance, the user may easily view information displayed on the display unit 20 while following the guidance robot 1.

Further, an upper end of the curved display 21 may extend to an upper end of the first middle cover 32, and a lower end of the curved display 21 may extend to the second cutout 332. In the present embodiment, the lower end of the curved display 21 may be formed so as not to further extend from the second cutout 332. When the curved display 21 covers the second cutout 332, the laser beam emitted from the rear lidar 118 strikes the lower end of the curved display 21. Accordingly, a problem may occur in which the guidance robot 1 cannot detect a distance between the guidance robot 1 and a rear obstacle.

Further, the display unit 20 may further include a support part 22 or display support. The support part 22 may function to support the curved display 21 such that the curved display 21 is located on the rear side of the first middle cover 32. The support part 22 may extend from the rear surface of the curved display 21. The support part 22 may vertically extend from the rear surface of the curved display 21, and may further protrude as it goes from the upper side to the lower side.

Further, the support part 22 may be inserted into the first middle cover 32 through the rear side of the first middle cover 32. An opening 324 through which the support part 22 may pass may be formed on the rear side of the first middle cover 32. The opening 324 may be formed by cutting a portion of the rear side of the peripheral surface of the first middle cover 32 or pre-made during fabrication.

Further, the display unit 20 may be fixed to an inside of the body 10 through a separate fixing member 138 (or a holder). In detail, the fixing member 138 configured to fix the display unit 20 to the body 10 may be provided inside the body 10. One side of the fixing member 138 may be fixed to the body, and the other side of the fixing member 138 may be fixed to the display unit 20. To this end, the other side of the fixing member 138 may protrude to the outside of the case 30 through the opening 324. That is, the support part 22 and the fixing member 138 may be located inside the opening 324 together.

In the present embodiment, the display unit 20 may be fastened to the fixing member 138 through a fastening unit (or fasteners). At this time, the support part 22 of the display unit 20 may be seated on the fixing member 138. In other words, the display unit 20 may be seated on the fixing member 138, and a portion of the fixing member 138 may be fixed to a portion of the display unit 20. According to such a fixing structure of the display unit 20, the display unit 20 may be stably located or maintained on the rear side of the first middle cover 32.

Referring to FIGS. 5 to 8, the body 10 according the present disclosure may include a driving unit 11. The driving unit 11 may include a plurality of components for driving of the guidance robot 1. The driving unit 11 may include the base 111. The base 111 may define the bottom surface of the guidance robot 1. The base 111 may have a circular plate shape, and may be located inside the bottom cover 34.

The driving unit 11 may include at least one wheel 112 for driving of the guidance robot 1, and motors 112b configured to transfer power to the wheels 112. The wheels 112 may be rotated by the power transferred from the motors 112b. The pair of wheels 112 may be configured, and one wheel 112 may be arranged on each of the left and right sides of the base 111. The pair of motors 112b may be configured, and may be coupled to the pair of wheels 112, respectively. However, the present disclosure is not limited thereto, e.g., one motor 112b may be configured to drive the pair of wheels 112.

The driving unit 11 may further include cliff detection sensors 113. The cliff detection sensors 113 may be sensors configured to detect a precipice, a cliff or a steep slope within a driving range of the guidance robot 1 in all direction, 360 degrees. The plurality of cliff detection sensors 113 may be included. As an example, the plurality of cliff detection sensors 113 may be arranged along an edge of the base 111 to be spaced apart from each other.

The driving unit 11 may further include first support ribs 114. The first support ribs 114 may support a first support plate 115, which will be described below. The first support ribs 114 may extend upwards from the upper surface of the base 111. As an example, the first support ribs 114 may extend upwards from an edge of the base 111. The plurality of first support ribs 114 may be included, some of the first support ribs 114 may be hollow or have recessed sides to minimize weight.

In the present embodiment, two first support ribs 114 may be connected to each other in an "L" shape. However, the present disclosure is not limited thereto. Further, the first support ribs 114 may be arranged in various positions and shapes.

The driving unit 11 may further include the first support plate 115. The first support plate 115 may be seated on the first support ribs 114. The first support plate 115 may have a plate shape. Further, the first support plate 115 may include volume-reducing holes 115a to minimize a weight. The plurality of volume-reducing holes 115a may be formed on the upper surface of the first support plate 115 to be spaced apart by a predetermined distance from each other.

The driving unit 11 may further include a first bumper 116. When an impact is applied from the outside, the first bumper 116 may be moved forward/rearward to absorb a predetermined amount of impact or shock. The first bumper 116 may have a hollow ring shape, and may be arranged on the upper surface of the first support plate 115.

The driving unit 11 may further include a battery 117. The battery 117 may supply electric power for driving of the guidance robot 1. The battery 117 may be arranged at the center of the upper surface of the first support plate 115 in consideration of a center of gravity of the guidance robot 1. Because the battery 117 has the largest ratio of the entire weight of the guidance robot 1, the battery 117 may be more likely to be located at a lower portion of the body 10. The battery 117 may include a Li-ion battery. However, the present disclosure is not limited thereto. Further, the battery 117 may include other types of batteries in addition to the Li-ion battery.

The driving unit 11 may further include the rear lidar 118 (Light, Detection and Ranging). The rear lidar 118, which is a laser radar, may be a sensor configured to perform location recognition (recognize a location) by irradiating a laser beam and collecting and analyzing a rearwards scattered light beam among light beams absorbed or scattered by an aerosol. The rear lidar 118 may be located on the rear side of the first support plate 115. The rear lidar 118 may be arranged to face the rear side of the guidance robot 1. Further, the rear lidar 118 may be exposed to the outside through the second cutout 332 formed in the second middle cover 33.

The driving unit 11 may further include second support ribs 119. The second support ribs 119 may support a second support plate 120, which will be described below. The second support ribs 119 may extend upwards from the upper surface of the first support plate 115.

The second support ribs 119 may be formed at an edge of the battery 117. As an example, the second support ribs 119 may be formed on opposite sides of the battery 117 to be spaced apart from each other. The plurality of second support ribs 119 may be formed to increase a support force, and upper ends of the plurality of second support ribs 119 may be connected to each other. That is, the second support ribs 119 may have an arc shape. However, the present disclosure is not limited thereto. Further, the second support ribs 119 may have various shapes.

The driving unit 11 may further include the second support plate 120. The second support plate 120 may be seated on the second support ribs 119. The second support plate 120 may have a plate shape. Further, the second support plate 120 may include volume-reducing holes or openings 120*a* to minimize a weight. The plurality of volume holes 120*a* may be formed on the upper surface of the second support plate 120 to be spaced apart from each other by a predetermined distance.

The driving unit 11 may further include a second bumper 121. When an impact is applied from the outside, the second bumper 121 may move or deflect in a forward/rearward direction to absorb a predetermined amount of impact, similar to the first bumper 116. The second bumper 121 may have a ring shape, and may be arranged on the upper surface of the second support plate 120.

The driving unit or section 11 may further include a height-adjusting rib 122. The height adjusting rib 122 may provide a predetermined height to the front lidar 136, which will be described below. The height adjusting rib 122 may be arranged below the front lidar 136, and may help to adjust heights of the front lidar 136 and the first cutout 331. The height adjusting rib 122 may extend upwards from the front side of the upper surface of the second support plate 120.

The body 10 may further include a body part, section or assembly 13. The body part 13 may be arranged above the driving unit or section 11, and various substrates 133 configured to control an overall operation of the guidance robot 1 may be provided in the body part 13. The substrates 133 may include a first substrate 133*a*, a second substrate 133*b*, a third substrate 133*c*, a fourth substrate 133*d*, and a fifth substrate 133*e*.

The body part 13 may include a main frame or main pillar 131. The main frame 131 may support the display unit 20 and a head 15, which will be described below. The main frame 131 may include a first main frame or pillar 131*a* and a second main frame or pillar 131*b*. The first main frame 131*a* and the second main frame 131*b* may have a column shape that extends vertically. The first main frame 131*a* and the second main frame 131*b* may be fixed to the upper surface of the second support plate 120.

As an example, the first main frame 131*a* and the second main frame 131*b* may be spaced apart from the center toward opposite sides of the second support plate 120 by the same interval or distance. The first main frame 131*a* and the second main frame 131*b* may be bilaterally symmetric to each other with respect to the center of the second support plate 120. Further, the head 15 may be coupled to upper ends of the first main frame 131*a* and the second main frame 131*b*.

The body part 13 may further include a third support plate 132. The third support plate 132 may be penetrated by the main frame 131, and may be fitted in any point of the main frame 131. The third support plate 132 may be located below a bisector with respect to a point bisecting the main frame 131, i.e., divides the main frame 131 into two equal parts. The third support plate 132 may has a disc shape, and may include volume-reducing holes or openings 132*a* to minimize a weight.

The body part 13 may further include the first substrate 133*a*. The first substrate 133*a* may be arranged on the upper surface of the third support plate 132. The first substrate 133*a* may include, for example, an application processor (AP) board. The AP board may function as a control unit or controller, configured to manage the entire system of a hardware module of the guidance robot 1.

The body part 13 may further include a sub frame 134. The sub frame or sub pillar 134 may be formed below the third support plate 132, and may function to support the third support plate 132. The sub frame 134 is formed to be lower than the height of the main frame 13.

The sub frame 134 may include a first sub frame or sub pillar 134*a* and a second sub frame or sub pillar 134*b*. The first sub frame 134*a* and the second sub frame 134*b* may have a column shape that extends vertically. Further, the first sub frame 134*a* and the second sub frame 134*b* may be fixed to the upper surface of the second support plate 120.

The first sub frame 134*a* and the second sub frame 134*b* may be arranged to be adjacent to the main frame 131. As an example, the first sub frame 134*a* and the second sub frame 134*b* may be spaced rearwards apart from the first main frame 131*a* and the second main frame 131*b* by the same interval, respectively. The first sub frame 134*a* and the second sub frame 134*b* may be bilaterally symmetric to each other with respect to the center of the second support plate 120. Further, the third support plate 132 may be coupled to upper ends of the first sub frame 134*a* and the second sub frame 134*a*.

The sub frame 134 may further include a third sub frame or sub pillar 134*c*. The third sub frame 134*c* may have a column shape that extends vertically. Further, the third sub frame 134*c* may be fixed to the upper surface of the second support plate 120, similar to the first sub frame 134*a* and the second sub frame 134*b*.

The third sub frame 134*c* may be arranged to be adjacent or close to the main frame 131. As an example, the third sub frame 134*c* may be spaced forwards apart from the center of the second support plate 120 by a predetermined distance. The third sub frame 134*c* may be located in front of the second support plate 120 in consideration of the center of gravity of the third support plate 132. Further, the third support plate 132 may be coupled to an upper end or top of the third sub frame 134*c*.

The body part 13 may further include a bracket 135. The bracket 135 may have a plate shape, may vertically extend, and may be coupled to the main frame 131. The bracket 135 may include a first bracket 135*a* and a second bracket 135*b*. The first bracket may be coupled to the first main frame 131*a*, and the second bracket 135*b* may be coupled to the second main frame 131*b*. The first bracket 135*a* and the second bracket 135*b* may be arranged to face each other. The first bracket 135*a* and the second bracket 135*b* may be fixed to surfaces of the first main frame 131*a* and the second main frame 131*b*, which face each other.

Further, the first bracket 135*a* and the second bracket 135*b* may extend downwards from the upper ends of the first main frame 131*a* and the second main frame 131*b*, respectively. Further, a lower portion of the first bracket 135*a* and a lower portion of the second bracket 135*b* may pass through the third support plate 132.

The body part 13 may further include the second substrate 133*b*. The second substrate 133*b* may be arranged in the first bracket 135a. The second substrate 133b may be arranged at a lower end of the first bracket 135a. The second substrate 133b may include, for example, a micro controller unit (MCU) board. The MCU board may control an overall operation of the guidance robot 1, and may include a memory in which data configured to support various functions of the guidance robot 1 is stored.

The body part 13 may further include the third substrate 133c. The third substrate 133c may be arranged in the first bracket 135a. The third substrate 133c may be arranged on the second substrate 133b. The third substrate 133c may include, for example, a stereo board. The stereo board may process sensing data collected by various sensors and cameras to manage data for recognizing the position of the guidance robot 1 and recognizing an obstacle.

The body part 13 may further include the fourth substrate 133d. The fourth substrate 133d may be arranged in the first bracket 135a. In detail, the fourth substrate 133d may be arranged on the third substrate 133c. The fourth substrate 133d may include, for example, a user interface board. The user interface board may control an operation of a component responsible for input and output of the user.

The body part 13 may further include the fifth substrate 133e. The fifth substrate 133e may be arranged in the second bracket 135b. In detail, the fifth substrate 133e may be arranged inside the second bracket 135b to face the second substrate 133b. The fifth substrate 133e may include, for example, a power board. The power board may perform a control such that electric power of the battery 117 is supplied to the components included in the guidance robot 1.

The present embodiment describes the body part 13 having the five substrates 133a, 133b, 133c, 133d, and 133e. However, the number of the substrates 133 is not limited the above number, and may be smaller or larger than the above number. Further, because the types of the substrates are described as an example, it is apparent that the types of the substrates are not limited to the above-described types of the substrates.

The body part 13 may further include the front lidar 137. The front lidar 137, which is a laser radar, may be a sensor configured to perform location recognition by irradiating a laser beam and collecting and analyzing a rearwards scattered light beam among light beams absorbed or scattered by an aerosol. The front lidar 137 may have the same or similar configuration as that of the rear lidar 118. However, the front lidar 137 may be located on the front side of the second support plate 120. The front lidar 137 may be arranged to face the front side of the guidance robot 1. Further, the front lidar 137 may be exposed to the outside through the first cutout 331 formed in the second middle cover 33. The front lidar 137 may be seated on the height adjusting rib 122 formed in the second support plate 120.

The body part 13 may further include a stereo camera 137. The stereo camera 137 may function to detect an obstacle in front of the guidance robot 1 together with the RGBD sensor 321. The stereo camera 137 may acquire a stereoscopic image using two cameras, and may measure a distance between the guidance robot 1 and the obstacle through the acquired stereoscopic image. As an example, the stereo camera 137 may be located directly above the front lidar 137. The stereo camera 137 may be fixed to one side of the third sub frame 134c. Further, the stereo camera 32 may photograph a front area of the guidance robot 1 through the stereo camera hole 323 formed in the first middle cover 32.

The body 10 may further include head 15. The head or head section 15 may be arranged above the body part 13. Further, the head 15 may be coupled to the top cover 31 and may be configured to rotate the top cover 31. The head 15 may include a stationary unit (FIG. 9 to be disused hereinafter) including a fourth support plate 161. The fourth support plate 161 may be seated on an upper end of the main frame 131, and may be coupled to the main frame 131. The fourth support plate 161 may has a disc shape, and may include volume-reducing holes or openings to minimize a weight.

The head 15 may further include a rotation member or a circular rotary unit 17. The rotation member 17 may be arranged on the fourth support plate 161, and may be rotated by a predetermined angle. The rotation member 17 may have a ring shape. Further, the rotation member 17 may be coupled to a rotation motor, which will be described below. The rotation member 17 may include a motor coupling part or a coupler extending from any point of an edge of the rotation member 17 to the center of the rotation member 17. Further, the edge of the rotation member 17 may be coupled to the top cover 31. The top cover 31 may be rotated together by rotation of the rotation member 17.

The head 15 may further include a rotation motor 172. The rotation motor 172 may provide power for rotating the rotation member 17. The rotation motor 172 may have a rotary shaft, and the rotary shaft may be coupled to the motor coupling part. The rotation member 17 may be rotated in one direction or the other direction by driving of the rotation motor 172. The rotation motor 172 may include, for example, a DC motor. However, the present disclosure is not limited thereto, and various motors such as a stepping motor may be applied.

With reference to FIGS. 1-8, the guide robot may be described as having a main body 10 with an internal skeletal frame covered by a shell 30. The skeletal frame includes a plurality of plates, e.g., plates 111, 115, 120, 132 and 161, stacked vertically and coupled by support ribs 114 and 119, a plurality of pillars 131a and 131b, and/or a plurality of sub-pillars 134a, 134b, and 134c. For example, a first support rib 114 couples a base plate 111 and a first support plate 115, and a second support rib 119 couples the first support plate with a second support plate 120. First, second and third sub-pillars 134a, 134b and 134c couple the second support plate 120 to a third support plate 132. First and second main pillars 131a and 131b couple the second support plate 120 to a fourth support plate 151.

Various components may be mounted between the spaces formed between the plurality of plates 111, 115, 120, 132 and 161. For example, a plurality of wheels 112 and motors 112b to drive the wheels 112 may be provided on the base plate 111 or within a space formed between the base plate 111 and the first support plate 115. A first bumper 116, a battery 117, a rear lidar 118 may be provided on the first support plate 115 or within a space formed between the first base plate 115 and the second support plate 120. On the fourth support plate, a skeletal plate 152 and a motor 153 to rotate the plate 152 may be provided. Details of other components provided on corresponding support plate or within a space between two support plates have been previously described above, and no further explanation is believed to be required. Further, placement and modification of the skeletal frame may be modified based on various needs and functional requirements of the guidance robot. For example, the shape of the support plate may be changed or the number of support plates may be varied. Further, metal or other non-metal rigid material, e.g., plastic, may be used to form the support plates depending on weight and design requirements.

Figure 6:
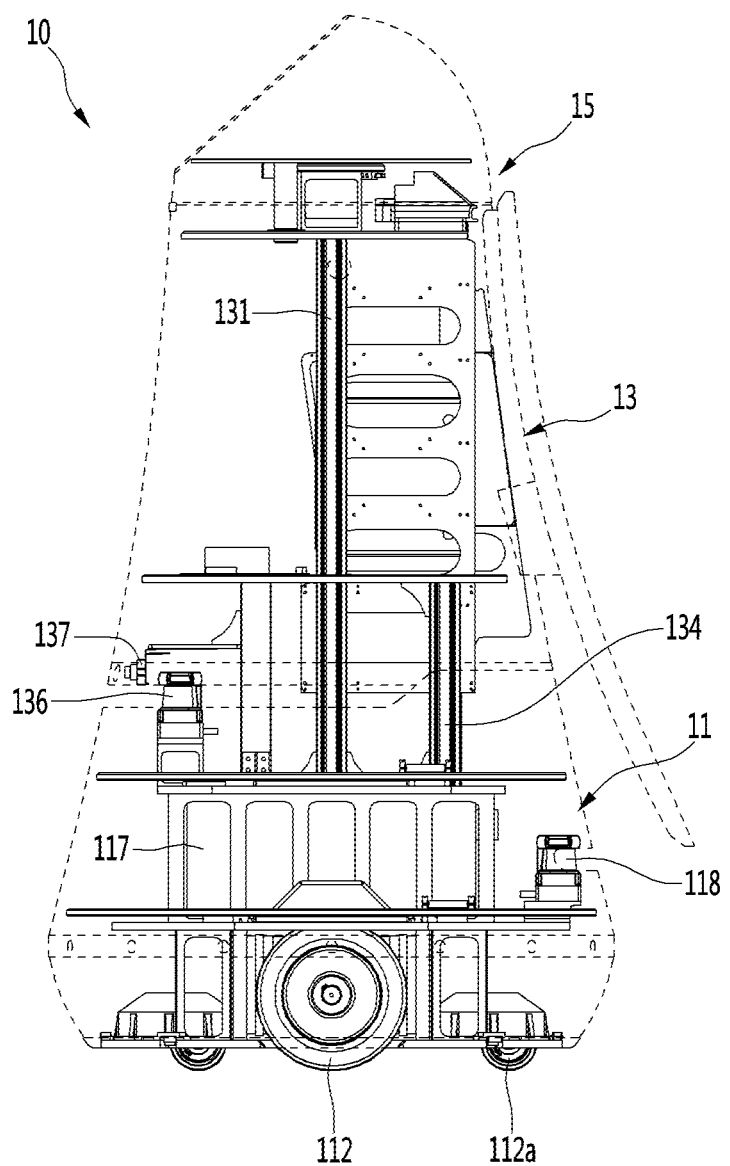
FIG. 6 is a side view of the body.
Figure 7:
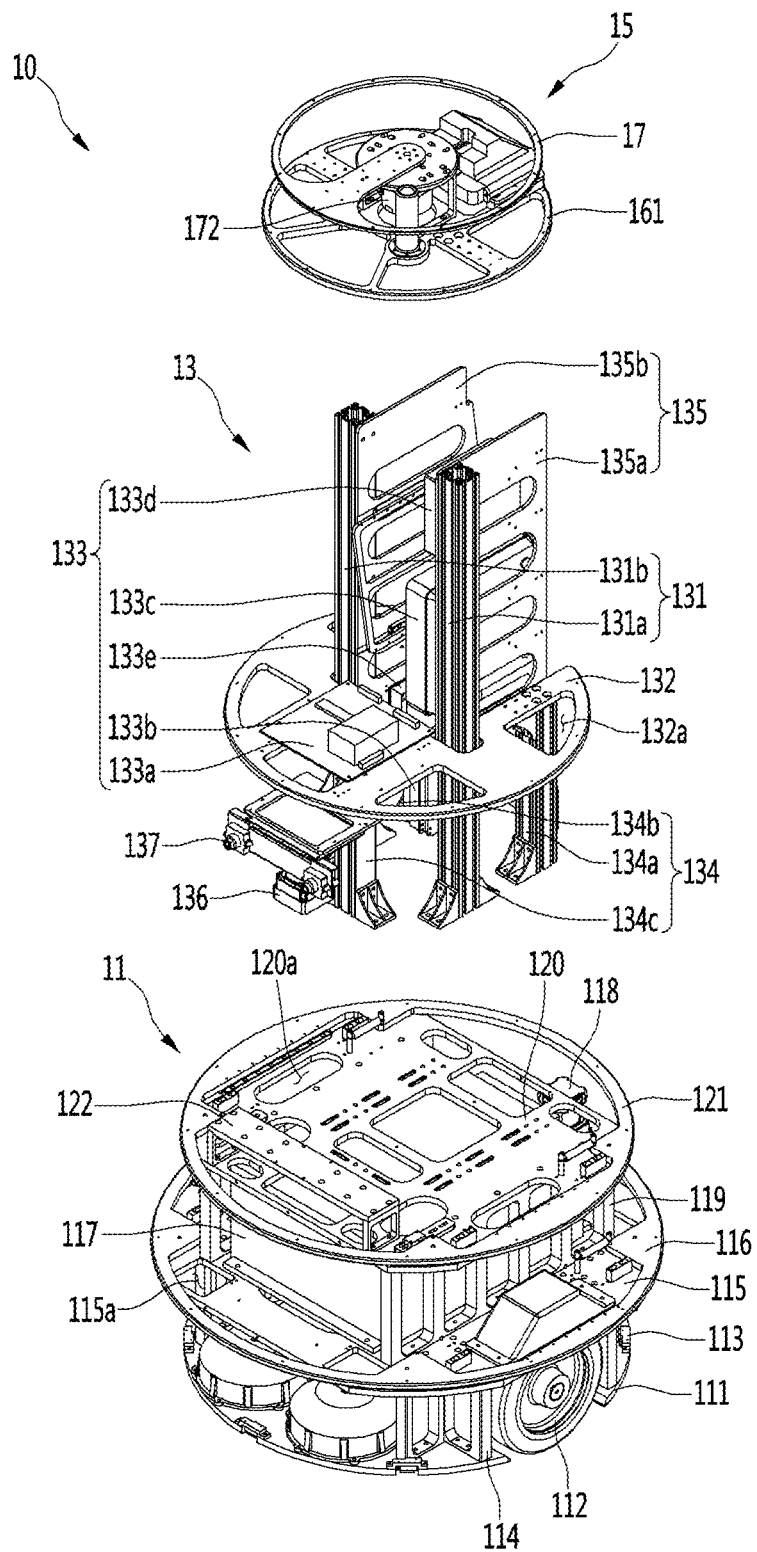
FIG. 7 is an exploded perspective view of the body.
Figure 8:
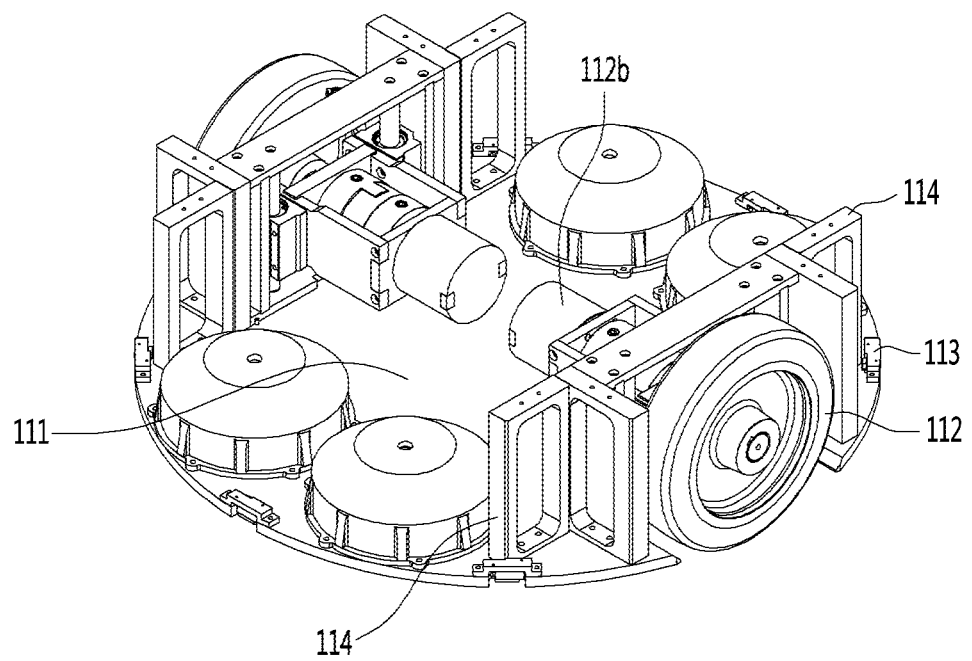
FIG. 8 is a view showing a motor and wheels of the driving unit of the body.

The shell 30 may comprise four pieces including a top section cover 31 a first middle section cover 32, a second middle section cover 33 and a bottom section 34. As can be appreciated, the shell 30 may be formed as a single piece and cut to four separate pieces. Alternatively, the four pieces may be made separately prior to assembly to the skeletal frame. Further, various holes for sensors or button openings may be cut out after the fabrication of the various covers or may be pre-made or molded during the fabrication process. The shell is thereafter fixed to the skeletal frame, and FIG. 6 illustrates an outline of the various covers on the skeletal frame.

Figure 9:
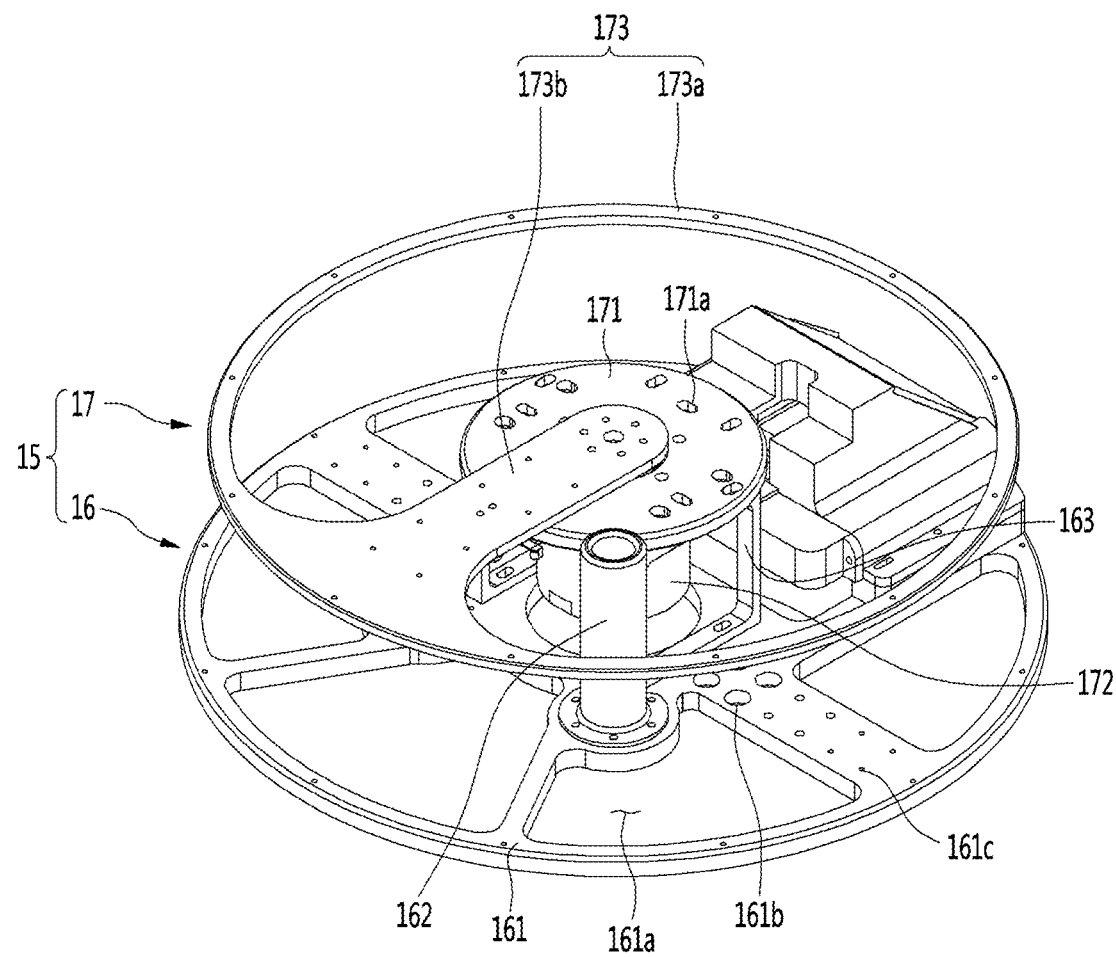
FIG. 9 is a perspective view of a head.
Figure 10:
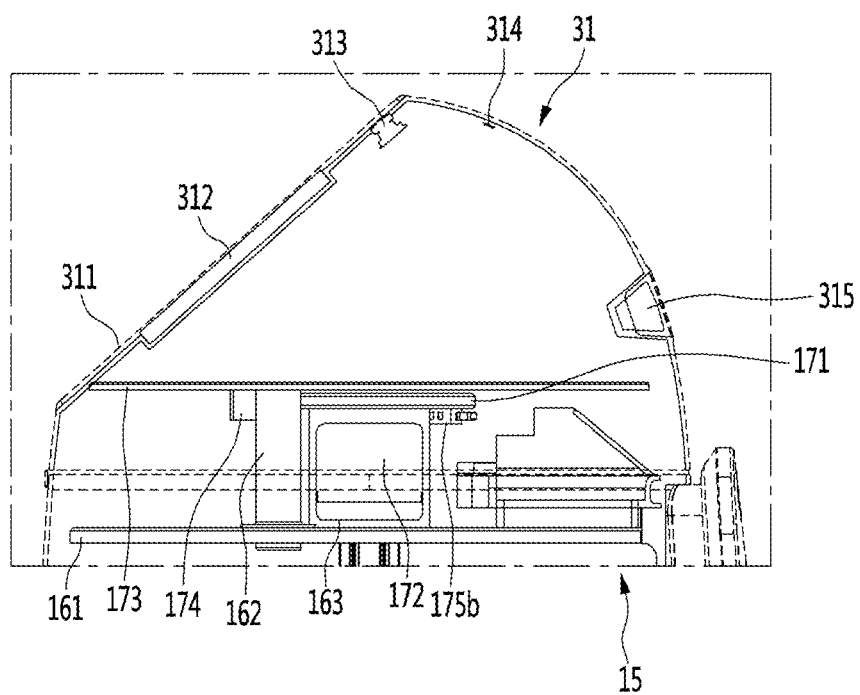
FIG. 10 is a side phantom view of the head combined with a top cover.
Figure 11:
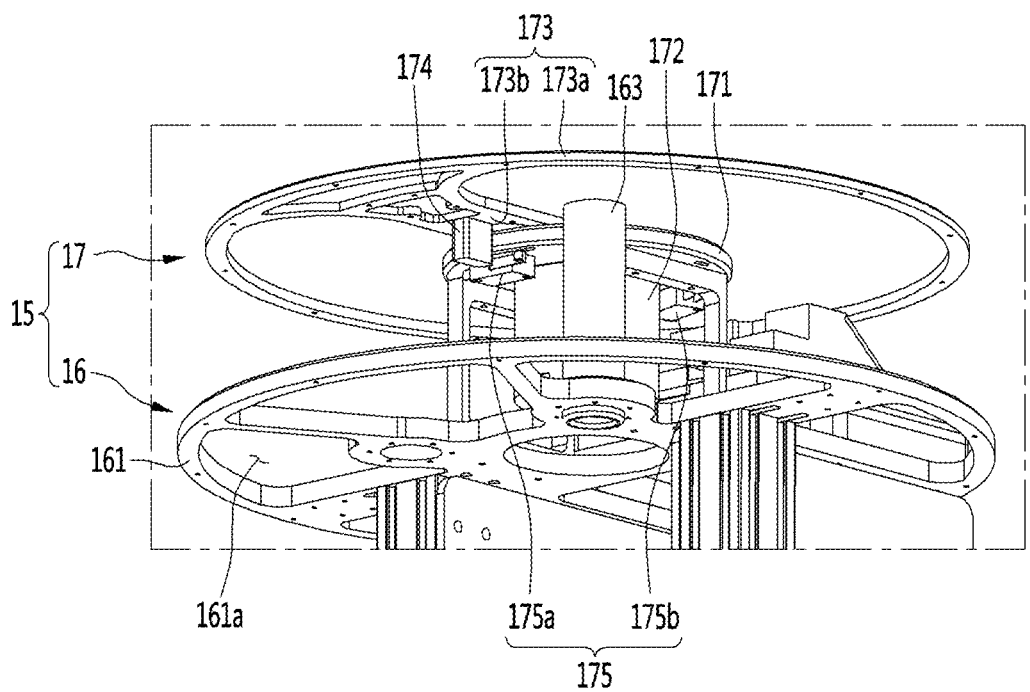
FIG. 11 is a view showing positions where a location sensor and a sensing target of the head are installed.

FIGS. 9 to 11 illustrate details of the head 15. The head 15 includes the stationary unit 16 and the circular rotary unit 17 rotatably provided over the stationary unit 16. The top cover 31 may be coupled to the circular rotary unit 17. For example, the outer side of the circular rotor unit 17 may be partially coupled to the inner side of the top cover 31.

The top cover 31, as described above, may have the operation unit 311 including the touch monitor 312 and the object sensor 313 on a side, the microphones 314 at the top, and the emergency button 315 on the opposite side to the touch monitor 312. When the circular rotary unit 17 is rotated, the operation unit 311, the microphones 314, and the emergency button 315 on the top cover 31 can be correspondingly rotated.

The stationary unit 16 may be formed by the fourth support plate 161. The fourth support plate 161 may have a disc shape and may have a reduction hole 161a to minimize the weight. The fourth support plate 161 may have a plurality of reduction holes 161a and the reduction holes 161 may be spaced from each other around the edge of the fourth support plate 161. The fourth support plate 161 may be placed on the top of the main frame 131. The fourth support plate 161 may be coupled to the top of the main frame 131.

The fourth support plate 161 may have coupling holes 161b to be coupled to the top of the main frame 131. The coupling holes 161b may be formed at positions corresponding to the position of the main frame 131, e.g., the positions of the first main frame 131a and the second main frame 131b. For example, the coupling holes 161b may be spaced at the same distance at both sides from the center of the fourth support plate 161.

The fourth support plate 161 may further have speaker-mounting holes 161c. The speaker-mounting holes 161c may be holes for mounting a speaker (not shown). The speaker may be fixed to the speaker-mounting holes 161c by fasteners. For example, the speaker-mounting holes 161c may be formed close to the edge of the fourth support plate 161. The speaker-mounting holes 161c may be positioned at sides from the coupling holes 161b. If two speakers are provided, the speaker-mounting holes 161c may be formed close to both edges of the fourth support plate 161.

The stationary unit 16 may further have a stopper 162. The stopper 161 can perform a function that limits rotation of the circular rotary unit 17. The stopper 162 may hits against the inner side of the circular rotary unit 17 when the circular rotary unit 17 is rotated in a first direction. When the stopper 162 hits against the inner side of the circular rotary unit 17, rotation of the circular rotary unit 17 can be physically stopped. The stopper 161 can perform a function that sets the maximum amount of rotation and the maximum rotational angle of the circular rotary unit 17.

The stopper 161, for example, may have a cylindrical shape and may extend upward on the upper surface of the fourth support plate 161. The stopper 162 may extend upward a predetermined length through the inside of the circular rotary unit 17. The stopper 162 may extend to the same height as the circular rotary unit 17 or over the height of the circular rotary unit 17. Accordingly, when the rotary circular unit 17 keeps rotating, the inner side of the circular rotary unit 17 is blocked by the stopper 162, so the rotation of the circular rotary unit 17 can be completely stopped.

The stationary unit 16 may further have a rotary support 163. The rotary support 163 can support the circular rotary unit 17. A pair of rotary supports 163 may be provided and the rotary supports 163 may be spaced at the same distance at both sides from the center of the fourth support plate 161. The rotary supports 163 can provide a predetermined height so that the circular rotary unit 17 is positioned over the stationary unit 16.

The circular rotary unit 17 may include a motor mount 171. A rotary motor 172 to be described below can be mounted on the motor mount 171. The motor mount 171 may be provided in parallel with the fourth support plate 161. The motor mount 171 may have a disc shape that is smaller in diameter than the fourth support plate 161. The motor mount 171 may be placed on the rotary supports 163. Accordingly, the motor mount 171 may be spaced upward from the fourth support plate 161. The motor mount 171 may be fixed to the tops of the rotary supports 163.

A plurality of oblong holes 171a may be formed through motor mount 171. The oblong holes 171a may include fastening holes for easily fastening the rotary motor 172 to the motor mount 171. The oblong holes 171a may include fastening holes for easily fastening the rotary supports 163 to the motor mount 171. Accordingly, poor assembly of the parts due to assembly errors can be prevented, so assembly precision and productivity can be improved.

The circular rotary unit 17 may further include the rotary motor 172. The rotary motor 172 can supply power for rotating the rotary member 173. The rotary motor 172 has a rotary shaft and the rotary shaft can be coupled to the rotary member 173. The rotary motor 172 is coupled to the bottom of the motor mount 171 and the rotary shaft is coupled to the rotary member 173 through the motor mount 171. Accordingly, the rotary member 173 can be rotated in a first direction or a second direction by the rotary motor 172. The rotary motor 172 may include a DC motor, but is not limited thereto, and various motors such as a stepping motor may be used.

The circular rotary unit 17 may further include the rotary member 173. The rotary member 173 is coupled to the rotary shaft of the rotary motor 172 and can be rotated in the first direction or the second direction. The rotary member 173 may be placed on the upper surface of the motor mount 171.

The rotary member 173 may have a coupling portion or a coupling arm 173b coupled to the rotary motor 172 and a rim 173a circumferentially extending from an end of the coupling portion 173b. The coupling portion 173b horizontally extends over the rotary motor 172 and has a first end coupled to the rotary shaft of the rotary motor 172. Accordingly, the coupling portion 173b can be rotated in the first direction or the second direction by the rotary motor 172.

The rim 173a may form a circular ring by circumferentially extending from a second end of the coupling portion 173b. The rim 173a may have a ring shape having a predetermined internal space. The rim 173a may be formed smaller than the diameter of the fourth support plate 161. The rim 173a may be partially coupled to the top cover 31 to support the top cover 31. For example, the outer side of the rim 173a may be partially coupled to the inner side of the top cover 31. When the rotary motor 172 is operated, the entire rotary member 173 can be rotated by the coupling portion 173b coupled to the rotary shaft of the rotary motor 172. Further, when the rotary member 173 is rotated, the top cover 31 coupled to the rim 173a can be rotated.

The coupling portion 173b is not only a part coupled to the rotary motor 172, but a part of which rotation is stopped by the stopper 162. The coupling portion 173b may be positioned at the same height as the stopper 162 or lower than the stopper 162. The stopper 162 extends upward through the rotary member 173 from the upper surface of the stationary unit 161. Accordingly, when the rotary member 173 keeps rotating in a predetermined direction, a side of the coupling portion 173b hits against the stopper 162, whereby the rotation of the rotary member 173 can be physically stopped.

The coupling portion 173b may be limited to a single part in this embodiment. The coupling portion 173b not only is coupled to the rotary shaft of the rotary motor 172, but can forcibly stop rotation of the rotary member 173 in a malfunction of the rotary motor 172. To this end, the coupling portion 173b extends only at one position on the inner side of the rim 173a. If there is provided a plurality of coupling portions 173a, the number of the coupling portions 173b that hit against the stopper 162 increases, so normal rotation may not be difficult. It may be preferable to form one coupling portion 173b and one stopper 162 in the present disclosure although not limited thereto.

Although the coupling portion 173b has a bar shape in this embodiment, it is not limited thereto. For example, an end portion of the coupling portion 173b may be formed in a disc shape. The end portion of the coupling portion 173b may be formed in a disc shape to cover the entire upper surface of the motor mount 171. In this case, the end portion of the coupling portion 173b can be seated on the entire upper surface of the motor mount 171, so the rotary member 173 can be stably rotated. However, the rotary member 173 may be hollow to reduce the entire weight of the rotary member 173.

The circular rotary unit 17 may further include a sensing target 174. The sensing target 174 may be a part that is sensed by a location sensor 175, which will be described below, to sense the location of the rotary member 173. The sensing target 174 may be formed at the coupling portion 173b of the rotary member 173. The sensing target 174 may be formed on the bottom of the coupling portion 173b to be sensed by the location sensor 175. According to this structure, when the rotary member 173 is rotated, the sensing target 174 is also rotated and can be sensed by the location sensor 175.

The circular rotary unit 17 may further include the location sensor 175. The location sensor 174 can sense the sensing target 174 to sense the location of the rotary member 173. The location sensor 175 may be provided to limit rotation of the rotary member 173. The reason of limiting rotation of the rotary member 173 is because if the rotary member 173 can rotate 360 degrees, it may excessively rotate, it is difficult to quickly locate the rotary member 173, and wires in the head 15 are entangled. It may be required to limit the maximum amount of rotation of the rotary member 173 when the rotary member 173 is rotated.

To this end, the location sensor 175 may be provided at the motor mount 171. In detail, the location sensor 175 may be provided on the bottom of the motor mount 171. One or two location sensors 175 may be provided. It is exemplified in the following description of this embodiment that two location sensors 175 are provided. However, the present disclosure is not limited thereto and one or over three location sensors 175 may be provided.

The location sensors 175 may include a first location sensor 175a and a second location sensor 175b. The first location sensor 175a may be provided at the front portion of the bottom of the motor mount 171. The second location sensor 175b may be provided at the rear portion of the bottom of the motor mount 171. The first location sensor 175a and the second location sensor 175b may be arranged to face opposite directions. However, the present disclosure is not limited thereto and, the first location sensor 175a and the second location sensor 175b may be arranged close to each other.

The first location sensor 175a and the second location sensor 175b can selectively sense the sensing target 174 while the rotary member 173 is rotated. For example, the first location sensor 175a and the second location sensor 175b may include a limit switch. The limit switch may be a general switch that can operate a built-in switch when an object comes in contact with a contact area. The sensing target 174 may selectively come in contact with two limit switches while the rotary member 173 is rotated. Accordingly, it is possible to sense the rotational direction and the amount of rotation of the rotary member 173 and accurately locate the rotary member 173.

Alternatively, the first location sensor 175a and the second location sensor 175b may include a hall sensor. The hall sensor may be a sensor that can sense a magnet having magnetic force. In this case, the sensing target 174 may include a magnet. The hall sensors may selectively sense the magnet while the rotary member 173 is rotated. Accordingly, it is possible to sense the rotational direction and the amount of rotation of the rotary member 173 and accurately locate the rotary member 173.

Alternatively, the first location sensor 175a and the second location sensor 175b may be proximity sensors or optical sensors. In this case, the sensing target 174 may protrude or may be open so that it can be sensed by the location sensors 175 while the rotary member 173 is rotated.

According to the location sensors 175, it is possible to quickly find the location such that the top cover 34 faces the front area when the guide robot 1 moves. Further, the location sensors 175 can quickly and accurately find the location when the rotary member 175 is being rotated or the guidance robot 1 starts to operate.

Figure 12:
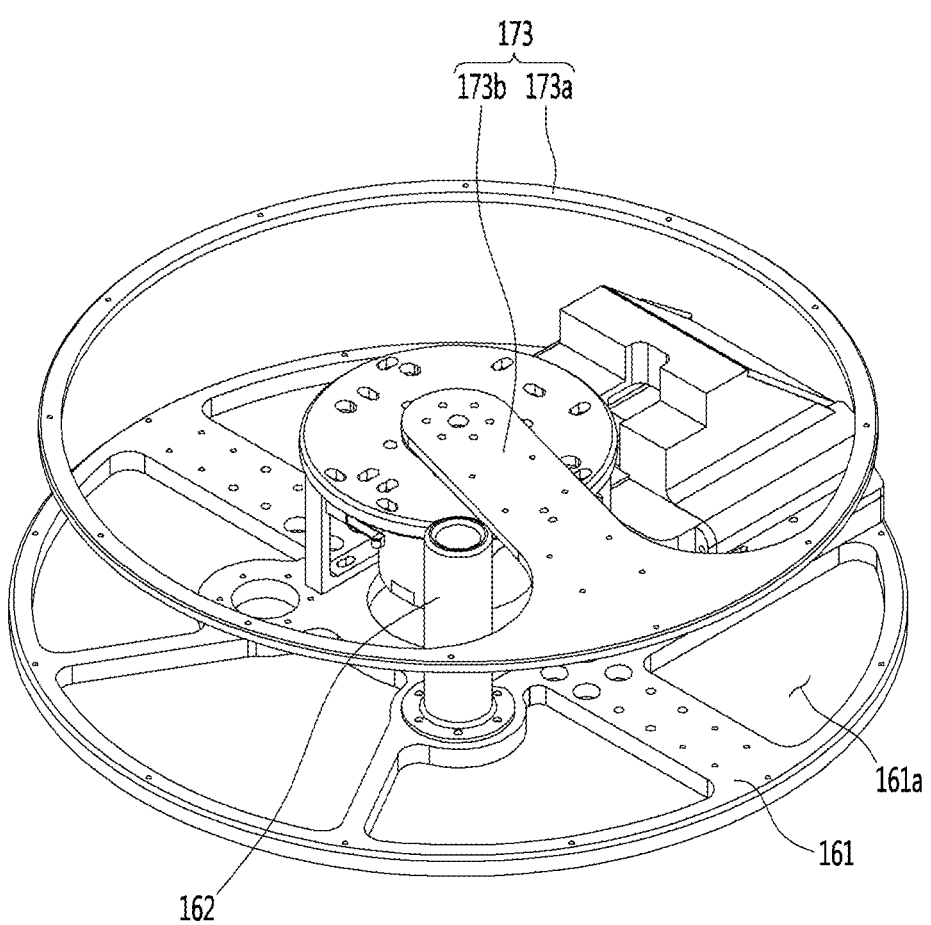
FIG. 12 is a view showing a state when a rotary member has been fully rotated.

The way that rotation of the rotary member of the head is limited by the stopper is described hereafter in detail with reference to the drawings. FIG. 12 is a view showing a state when a rotary member has been fully rotated. The rotary member 174 can be rotated in a first direction (clockwise in the figure) by the rotary motor 172. For example, when a voice instruction from a user is received, the rotary member 173 can rotate toward the user. While the rotary member 173 keeps rotating in the first direction, the coupling portion 173 may be blocked by the stopper 162. In this case, the stopper 162 interferes with rotation of the coupling portion 173, so rotation of the rotary member 173 can be physically limited.

Alternatively, rotation of the rotary member 173 may be limited by the location sensors 175. For example, when the location sensors 175 sense the sensing target 174, they can make rotation of the rotary member 173 stop. However, when the rotary member 173 is excessively rotated by a malfunction of the location sensors 175, excessive rotation of the rotary member 173 can be prevented by the stopper 162. According to the present disclosure, rotation of the rotary member 173 can be limited double by the location sensors 175 and the stopper 162.

According to the configuration of the present disclosure, since it is possible to unnecessary excessive rotation of the rotary member, the top cover can quickly rotate toward a user.

Further, since the rotary member can be stably rotated and, if necessary, rotation of the rotary member can be physically stopped, it is possible to prevent damage to the product and improve safety.

Further, since the rotary member can quickly rotate toward a user, it is possible to quickly provide a route guide service to the user.

Further, since it is possible to sense the rotational angle or the amount of rotation of the rotary member, it is possible to quickly and accurately locate the rotary member.

The present disclosure has been made in an effort to solve the problems and an object of the present disclosure is to provide a guidance robot that can attenuate shock that is generated when it collides with a person or an obstacle.

Another object of the present disclosure is to provide a guidance robot that can prevent person's feet from getting caught in the wheels thereof.

Another object of the present disclosure is to provide a guidance robot that allows a user to conveniently operate the robot while looking down an operation unit of the robot.

Another object of the present disclosure is to provide a guidance robot that allows people to easily see the information on a display even if the robot is moving for route guide.

Another object of the present disclosure is to provide a guidance robot that can stably move without hitting against surrounding obstacles.

Another object of the present disclosure is to provide a guidance robot that can solve a problem due to interference between a laser from a lidar device of the robot and a laser from a lidar device of another robot.

Another object of the present disclosure is to provide a guidance robot that allows people to easily see the information on a display unit not only from a far position, but at various angles.

Another object of the present disclosure is to provide a guidance robot that can prevent excessive rotation of a rotary member coupled to a top cover.

Another object of the present disclosure is to provide a guidance robot that can physically stop rotation of the rotary member.

Another object of the present disclosure is to provide a guidance robot that allows for stable rotation of the rotary member.

Another object of the present disclosure is to provide a guidance robot that allows the rotary member to quickly rotate toward a user.

Another object of the present disclosure is to provide a guidance robot that can sense a rotational direction or a rotational amount of the rotary member.

A guidance robot according to an embodiment of the present disclosure includes: a driving unit that includes wheels and a motor for moving; a body that is provided on the driving unit and includes sensors for autonomous driving; a display unit that is coupled to the body; a stationary unit that is coupled to the top of the body; a circular rotary unit that has an opening and is provided over the stationary unit to rotate about the central axis of the stationary unit; and a stopper that extends upward from the stationary unit through the opening of the circular rotary unit.

The circular rotary unit may be provided in parallel with the stationary unit and the stopper may limit rotation of the circular rotary unit by coming in contact with the inner side of the circular rotary unit when the circular rotary unit is rotated.

The circular rotary unit may include: a motor that is spaced upward from the stationary unit; a motor mount that is coupled to the rotary motor; and a rotary member that is coupled to the rotary motor to rotate on the motor mount.

The rotary member may have: a coupling portion that laterally extends over the motor mount with a first end coupled to a rotary shaft of the rotary motor; and a rim that forms a circular ring by circumferentially extending from a second end of the coupling portion.

The coupling portion may be positioned at the same height as the stopper or lower than the stopper.

The guidance robot may further include: a sensing target that is provided at the coupling portion; and a location sensor that is provided at the motor mount to sense the sensing target.

When the location sensor senses the sensing target, operation of the rotary motor may be stopped.

The location sensor may include: a first location sensor that is provided on a side of the motor mount; and a second location sensor that is provided on the opposite side to the first location sensor.

The location sensor may include a limit switch and the sensing target may selectively come in contact with the limit switch when the coupling portion is rotated.

The location sensor may include a hall sensor and the sensing target may have a magnet that is sensed by the hall sensor.

The location sensor may include a proximity sensor or an optical sensor and the sensing target may protrude or may be open to be sensed by the proximity sensor or the optical sensor.

The sensing target may be formed on the bottom of the coupling portion and the location sensor may be provided on the bottom of the motor mount.

The guidance robot may further include a top cover that is coupled to the circular rotary unit. The top cover may have a semispherical shape and an operation unit may be provided on a side formed by partially cutting the top cover.

The operation unit may include a touch monitor inclined to receive touch input.

When the guidance robot moves, the operation unit may face the movement direction of the guidance robot and the display unit may face the opposite direction to the movement direction.

The operation unit may include at least one of a 2D camera and an RGBD (Red Green Blue Depth) sensor for discriminating a person or an object.

The guidance robot may further include a case that forms the external shape of the guidance robot and increases in diameter as it goes down.

The case may include: a top cover that is rotatably coupled to the circular rotary unit; a cylindrical middle cover that is provided under the top cover; and a cylindrical bottom cover that is provided under the middle cover, the middle cover may increase in diameter as it goes down, and the bottom cover may decrease in diameter as it goes down.

The middle cover may include: a first middle cover that has a cylindrical shape; and a second middle cover that is provided under the first middle cover and has a cylindrical shape having a larger diameter than the first middle cover, and the display unit may extend from the top to the bottom of the first middle cover and may have a concave shape curved with a predetermined curvature.

According to the configuration of the present invention, since it is possible to attenuate shock when the robot collides with a person or an obstacle, it is possible to improve durability and safety of the robot.

Further, since the robot has entirely a tumbler shape, it is possible to provide visual stability and the center of gravity of the robot is positioned low, so the robot can be stably moved and supported.

Further, since it is possible to prevent a person from getting his/her feet caught in the wheels of the robot while the robot moves, it is possible to reduce severe human injuries.

Further, since a user can conveniently operate the operation unit of the robot while looking down the operation unit, the user can be conveniently and quickly provided with a route guide service Further, since a user can easily see the information displayed on the display while following the robot even though the robot is moving for route guide, the user can be effectively provided with a route guide service.

Further, since the robot can stably move without hitting against surrounding obstacles, users can be provided with a smooth and quick route guide service.

Further, since the problem that a laser from a lidar device of a robot and a laser from a lidar device of another robot interfere with each other is not generated, malfunction of the robot due to laser interference can be prevented.

Further, since it is possible to easily see the information displayed on the display unit not only far from the robot, but at various angles, visibility and readability are improved.

A structure of rotating the top cover by rotating the head is described hereafter in detail with the drawings.

This application relates to U.S. application Ser. No. 15/853,409, and U.S. application Ser. No. 15/853,533, both filed on Dec. 22, 2017, which are hereby incorporated by reference in their entirety. Further, one of ordinary skill in the art will recognize that features disclosed in these above-noted applications may be combined in any combination with features disclosed herein.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A guidance robot comprising:
   a drive section that includes wheels and a motor to rotate at least one;
   a body that is provided over the drive section and includes at least one sensor for autonomous movement;
   a display unit that is coupled to the body;
   a stationary plate that is coupled to a top of the body;

a rotary disc that has an opening and is provided over the stationary plate to rotate about a central axis of the stationary plate; and a stopper that extends upward from the stationary plate through the opening of the rotary disc.

2. The guidance robot of claim 1, wherein the rotary disc is provided in parallel with the stationary plate, and the stopper limits rotation of the rotary disc by coming in contact with an inner side of the opening when the rotary disc is rotated.

3. The guidance robot of claim 2, further comprising:

a rotary motor provided over the stationary plate; and a motor mount that is coupled to the rotary motor, wherein the rotary disc is coupled to the rotary motor to rotate on the motor mount.

4. The guidance robot of claim 3, wherein the rotary disc includes:

an arm that laterally extends over the motor mount with a first end coupled to a rotary shaft of the rotary motor; and a rim that forms a circular ring by circumferentially extending from a second end of the arm.

5. The guidance robot of claim 4, wherein the arm is positioned at a same height as the stopper or lower than the stopper.

6. The guidance robot of claim 4, further comprising:

a sensing target that is provided at the arm; and a location sensor that is provided at the motor mount to sense the sensing target.

7. The guidance robot of claim 6, wherein when the location sensor senses the sensing target, operation of the rotary motor is stopped.

8. The guidance robot of claim 6, wherein the location sensor includes:

a first location sensor that is provided on a first side of the motor mount; and a second location sensor that is provided on a second side of the motor mount that is opposite to the first location sensor.

9. The guidance robot of claim 6, wherein the location sensor includes a limit switch, and the sensing target selectively comes in contact with the limit switch when the arm is rotated.

10. The guidance robot of claim 6, wherein the location sensor includes a hall sensor, and the sensing target has a magnet that is sensed by the hall sensor.

11. The guidance robot of claim 6, wherein the location sensor includes a proximity sensor or an optical sensor, and the sensing target protrudes or is open to be sensed by the proximity sensor or the optical sensor.

12. The guidance robot of claim 6, wherein the sensing target is formed on a bottom of the arm, and the location sensor is provided on a bottom of the motor mount.

13. The guidance robot of claim 1, further comprising a top cover that is coupled to the rotary disc.

14. The guidance robot of claim 13, wherein the top cover has a semispherical shape and a user interface is provided on a side formed by partially cutting the top cover.

15. The guidance robot of claim 14, wherein the user interface includes a touch monitor inclined to receive touch input.

16. The guidance robot of claim 14, wherein when the guidance robot moves, the user interface faces a movement direction of the guidance robot, and the display unit faces a direction opposite to the movement direction.

17. The guidance robot of claim 14, further comprising at least one of a 2D camera or an RGBD (Red Green Blue Depth) sensor for discriminating a person or an object.

18. The guidance robot of claim 1, further comprising a shell that forms an external shape of the guidance robot and increases in diameter from a top of the body to a bottom of the body.

19. The guidance robot of claim 18, wherein the shell includes:

a top cover that is rotatably coupled to the rotary disc;

a cylindrical middle cover that is provided under the top cover; and a cylindrical bottom cover that is provided under the middle cover, wherein the middle cover increases in diameter as the middle cover extends downward, and the bottom cover decreases in diameter as the bottom cover extends downward.

20. The guidance robot of claim 19, wherein the middle cover includes:

a first middle cover that has a cylindrical shape; and a second middle cover that is provided under the first middle cover and has a cylindrical shape having a larger diameter than the first middle cover, and wherein the display unit extends from a top to a bottom of the first middle cover and has a concave shape curved with a predetermined curvature.

* * * * *